US007551776B2

(12) United States Patent
Jeffrey et al.

(10) Patent No.: US 7,551,776 B2
(45) Date of Patent: Jun. 23, 2009

(54) HISTOGRAM GENERATION APPARATUS AND METHOD FOR OPERATING THE SAME

(75) Inventors: Eric Jeffrey, Richmond (CA); Phil Van Dyke, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 907 days.

(21) Appl. No.: 10/896,797

(22) Filed: Jul. 22, 2004

(65) Prior Publication Data

US 2006/0018538 A1 Jan. 26, 2006

(51) Int. Cl.
*G06K 9/00* (2006.01)
(52) U.S. Cl. ...................................... 382/168
(58) Field of Classification Search ............... 382/162, 382/168; 358/522; 345/617
See application file for complete search history.

(56) References Cited

U.S. PATENT DOCUMENTS

| | | | | |
|---|---|---|---|---|
| 5,295,202 | A | 3/1994 | Steinkirchner et al. | 372/167 |
| 5,617,484 | A | 4/1997 | Wada et al. | 382/172 |
| 5,719,953 | A | 2/1998 | Okabayashi et al. | 382/151 |
| 6,091,853 | A | 7/2000 | Otto | 382/232 |
| 6,130,724 | A | 10/2000 | Hwang | 348/678 |
| 6,442,294 | B1 | 8/2002 | Nishizawa et al. | 382/168 |
| 6,449,390 | B1 | 9/2002 | Inoue | 382/168 |
| 2001/0036312 | A1 | 11/2001 | Shigeta et al. | 382/168 |
| 2002/0110277 | A1 | 8/2002 | Ono et al. | 382/168 |
| 2003/0123749 | A1 | 7/2003 | Cheng et al. | 382/275 |
| 2003/0231347 | A1 | 12/2003 | Imai | 358/2.1 |
| 2004/0001637 | A1 | 1/2004 | Mitchell et al. | 382/239 |
| 2004/0004666 | A1 | 1/2004 | Sano | 348/354 |

OTHER PUBLICATIONS

"Digital Signal Processor With Efficient RGB Interpolation And Histogram Acumulation", Hansoo Kim, Joung-Youn Kim, Seung Ho Hwang, In-Cheol Park, and Chong-Min Kyung, IEEE Transactions on Consumer Electronics, vol. 44, No. 4, Nov. 1998 (pp. 1389-1395).

*Primary Examiner*—Duy M Dang (57) ABSTRACT

Histogram circuitry is provided to increment a tonal value tally corresponding to received pixel data without immediately writing the incremented tally back to a histogram table within a main memory. Instead, the tonal value and corresponding incremented tonal value tally are stored in a temporary memory of the histogram circuitry. Since received pixel data has a high likelihood of having the same tonal value as recently received pixel data, the tonal value of the received pixel data is first checked for a match with one of the recently received tonal values stored in the temporary memory. If the received tonal value is present in the temporary memory, there is no need to access the histogram table within the main memory to retrieve the corresponding tally. The tally corresponding to the received tonal value can simply be incremented in the temporary memory of the histogram circuitry.

24 Claims, 5 Drawing Sheets

HISTOGRAM GENERATION APPARATUS AND METHOD FOR OPERATING THE SAME

BACKGROUND OF THE INVENTION

1. Field of the Invention

The present invention relates generally to display of digital image data.

2. Description of the Related Art

Contrast within an image, such as that captured by a digital camera, can often need improvement. If the image has insufficient contrast, features and details of the image may be indistinguishable from other portions of the image. Therefore, evaluation and adjustment of the image contrast may be useful prior to display.

One method for evaluating the contrast of the image includes generating a histogram table for the image. The histogram table represents a frequency of occurrence of each pixel value within the image. Therefore, evaluation of the histogram table can identify similar pixel values that occur with sufficient frequency in the image such that contrast is adversely affected. Using the information gleaned from the histogram table, the image can be appropriately refined to improve contrast prior to display.

Conventionally, data defining both the image and the associated histogram table is stored in a random access memory (RAM). Histogram circuitry is used to compute the histogram table for the incoming image and store the histogram table in the RAM. For each incoming pixel defining the image, the histogram circuitry of the prior art first operates to determine a value of the pixel. Using the determined pixel value as an address into the histogram table, the histogram circuitry of the prior art then reads a tally value corresponding to the pixel from the histogram table in the RAM. The histogram circuitry of the prior art then operates to increment the tally value by one. Then, the histogram circuitry of the prior art writes the incremented tally value for the pixel back to the histogram table in the RAM. Thus, for each incoming pixel, the histogram circuitry of the prior art performs a read operation from the RAM, an increment operation, and a write operation to the RAM. Performing the read and write operations for each incoming pixel to generate the histogram table utilizes a large amount of available RAM bandwidth. Therefore, the conventional histogram circuitry both reduces the amount of RAM bandwidth available for other processes and consumes a large amount of power. Furthermore, increased power consumption can be particularly problematic in mobile electronic devices where power is generally at a premium.

In view of the foregoing, there is a need for an improved histogram table generation system that requires less RAM bandwidth and less power consumption.

SUMMARY OF THE INVENTION

In one embodiment, a histogram generation circuit for processing pixel data of a digital image frame is disclosed. The histogram generation circuit includes a temporary memory configured to hold a set of tonal values and associated tallies, where each tonal value has one associated tally. The histogram generation circuit also includes a comparison circuit for determining if tonal values of incoming pixel data are currently stored in the temporary memory, wherein the incoming pixel data defines a current frame being processed. Additionally, the histogram generation circuit includes an incrementer circuit for incrementing tallies of tonal values stored in the temporary memory. The tallies are incrementing to maintain a true number of occurrences of their respective tonal values within the current frame being processed.

In another embodiment, a histogram circuit for processing a received stream of pixel data for a frame of pixels is disclosed. The histogram circuit includes a temporary memory configured to store a number of tonal values and associated tallies for the received stream of pixel data. Each tonal value and associated tally represents a portion of a histogram table for the frame of pixels. Also, the temporary memory is separate from a main memory, wherein the main memory is defined to store the histogram table. The histogram circuit also includes a comparison circuit configured to determine if the tonal value received by the histogram circuit is equal to a tonal value stored in the temporary memory. The histogram circuit further includes an incrementer circuit configured to increment a tally stored in the temporary memory that is associated with the tonal value that has been identified by the comparison circuit as being equal to the tonal value received by the histogram circuit. Additionally, the histogram circuit includes a memory interface circuit configured to transfer tallies between the temporary memory and the main memory so that the tallies in the temporary memory are maintained current relative to the received stream of pixel data during active processing of the frame.

In another embodiment, a method for operating histogram circuitry to generate a histogram for a digital image is disclosed. The method includes an operation for receiving a tonal value for a pixel of the digital image. An operation is then performed to determine if the tonal value is present in a temporary memory of the histogram circuitry. If the tonal value is determined to be present in the temporary memory, the method includes an operation for incrementing in the temporary memory a tally associated with the tonal value. If the tonal value is determined to be absent from the temporary memory, the method includes an operation for retrieving from a main memory a tally associated with the tonal value. The method further includes an operation for incrementing the tally retrieved from the main memory. Additionally, an operation is included for storing both the incremented tally retrieved from the main memory and the associated tonal value in the temporary memory.

In another embodiment, a graphics controller is disclosed. The graphics controller includes a camera interface, a main memory, and histogram circuitry. Both the main memory and the histogram circuitry are connected to receive digital image data from the camera interface. The digital image data includes a tonal value for each pixel in the digital image. The main memory includes an image portion and a histogram portion. The digital image data received by the main memory from the camera interface is stored in the image portion. The histogram circuitry is connected to receive the digital image data from the camera interface and generate a histogram for the digital image. Also, the histogram circuitry includes a temporary memory configured to store a number of tonal values and associated tallies. The temporary memory is separate from the main memory. Each of the tallies represents a frequency of occurrence of an associated tonal value within the digital image. Each tonal value and associated tally represents a portion of the histogram for the digital image.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

A digital image is created by mapping a captured image onto a grid of picture elements or pixels. Each pixel is assigned a tonal value, i.e., pixel value, that most closely corresponds to a portion of the captured image that the pixel is intended to represent. In digital imaging, the tonal value of the pixel is represented as a binary code defined by a sequence of binary digits. The number of binary digits used to define each tonal value represents a bit depth of the digital image. A larger bit depth corresponds to a larger set of possible tonal values that can be used to define each pixel in the digital image. For example, in a black and white image having a bit depth of 1 there are ($2^1$) or 2 possible tonal values that can be assigned to each pixel. In a gray scale or color image having a bit depth of 8 there are ($2^8$) or 256 possible tonal values available for assignment to each pixel. Furthermore, an image having a bit depth of 16 will have ($2^{16}$) or 65536 possible tonal values for each pixel. It should be appreciated that the present invention can be implemented in conjunction with any bit depth, including bit depths not explicitly identified herein.

The tonal values used to define a digital image can also be used to evaluate properties of the digital image such as contrast. For example, a digital image that includes a large number of pixels having the same or similar tonal value may be identified as having low contrast, thus resulting in obscuring of features or details within the image. Information obtained from analyzing the tonal values of the digital image can be used to refine/improve the image properties prior to display.

One approach for analyzing the tonal values of the digital image is to develop a histogram table for the image, wherein the histogram table represents a frequency of occurrence of each possible tonal value in the image. In the histogram table, a tally is generated for each possible tonal value based on the bit depth of the digital image. Each tally represents a frequency of occurrence of its corresponding tonal value in the digital image. Thus, each pixel in the digital image having a particular tonal value will contribute one count to the tally for the particular tonal value. Once each pixel in the digital image is appropriately tallied into the histogram table, the histogram table can be evaluated to identify contrast issues and improve the image as necessary prior to display.

In "real life" digital images, such as those captured by a digital camera, tonal values of adjacent pixels are often highly correlated. Therefore, given the tonal value of a particular pixel, a high probability exists that neighboring pixels will have tonal values equal to, or very close to, the tonal value of the particular pixel. Broadly speaking, the present invention uses this correlation between tonal values of adjacent pixels to reduce memory, i.e., RAM, bandwidth and power consumption required to generate the histogram table.

Figure 1:
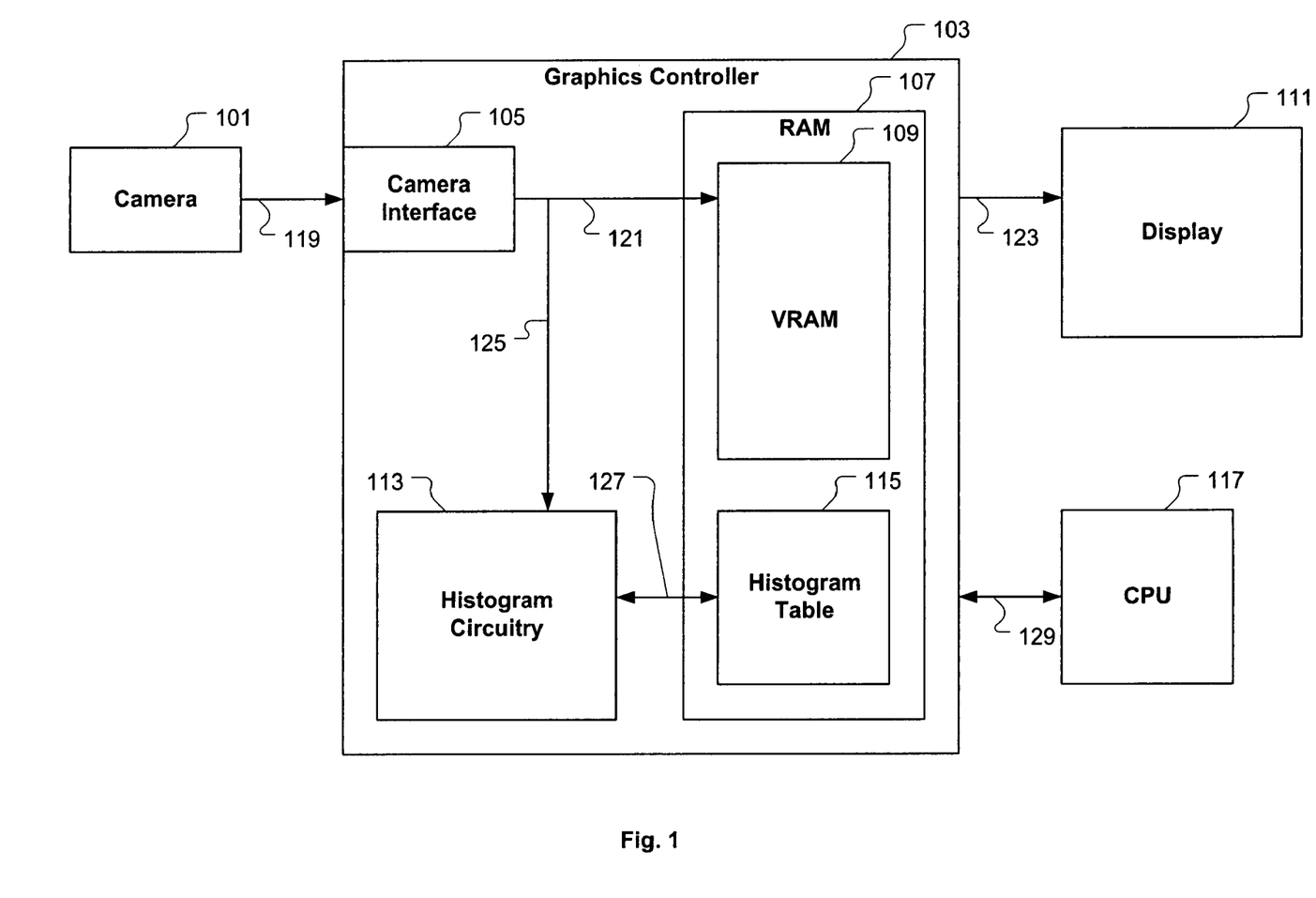
FIG. 1 is an illustration showing a digital image processing system, in accordance with one embodiment of the present invention.

FIG. 1 is an illustration showing a digital image processing system, in accordance with one embodiment of the present invention. The processing system includes a camera 101, a graphics controller 103, a central processing unit (CPU) 117, and a display 111. It should be appreciated that the camera 101 can be a digital camera, a digital video camera, or any other device capable of capturing images in a digital format. Also, it should be appreciated that the display 111 can be any type of display device capable of rendering an image defined by electronic signals, e.g., a liquid crystal display (LCD), a plasma display, a cathode ray tube (CRT) display, etc. The CPU 117 represents a generalized host device CPU. It should be appreciated that the graphics controller 103 can be implemented in a host device to provide the host device with digital image processing capability.

The graphics controller 103 includes a camera interface 105, a random access memory 107, and histogram circuitry 113. The camera interface 105 is configured to receive digital image data from the camera 101 as indicated by arrow 119. Digital image data from the camera 101 enters the camera interface 105 as a stream of bytes. In one embodiment, the digital image data arrives at the camera interface 105 in pixel order according to a raster sequence. The digital image data arriving at the camera interface 105 can represent streaming video from a digital video camera or a single snapshot from a digital camera. In the case of streaming video, each arriving frame of video can be considered as a single digital image, similar to the single snapshot arriving from the digital camera. Since the histogram table is generated on a single digital image basis, the present invention is described in terms of receiving and processing data for a single digital image. However, it should be understood that the present invention can be implemented with both streaming video and snapshot images.

Following arrival at the camera interface 105, the digital image data is stored in a video RAM (VRAM) 109 portion of the RAM 107 on-board the graphics controller 103, as indicated by arrow 121. Once the entire digital image is stored in the VRAM 109, the data defining the digital image can be converted into an appropriate electronic format for transmission to the display 111, as indicated by arrow 123. At the display 111, the digital image is rendered for viewing.

As previously mentioned, however, it may be necessary to refine the digital image prior to transmission to the display 111 for viewing. The histogram circuitry 113 provides functionality necessary to generate the histogram table to be used for evaluating the contrast of the digital image. During operation, a histogram table can be generated for each incoming digital image or for selected incoming digital images. Whenever a histogram is to be generated for an incoming digital image, the digital image data is transmitted from the camera interface 105 to the histogram circuitry 113, as indicated by arrow 125. The histogram circuitry 113 operates to determine the tonal value for each incoming pixel and ensure that the corresponding tonal value tally in a histogram table portion of RAM 115 gets updated accordingly, as indicated by arrow 127. Once the entirety of the digital image data has been received and processed by the histogram circuitry 113, the CPU 117 can be operated to analyze the histogram table and make appropriate adjustments to the digital image data as it is transmitted from the VRAM 109 to the display 111, as indicated by arrow 129. In one embodiment, the CPU 117 will wait to analyze the histogram table until the entire digital image has been processed and the histogram table is complete.

In one embodiment, a lookup table can be implemented between the VRAM 109 and the display 111. Digital image data from the VRAM 109 can be passed through the lookup table en route to the display 111. Values in the lookup table can be set by the CPU 117 based on the results obtained from analyzing the histogram table. The digital data can then be modified according to values set by the CPU 117 in the lookup table. In one embodiment, the lookup table can be disposed within the graphics controller 103.

In one digital video embodiment, the CPU 117 does not analyze the histogram table for every frame. For example, the CPU 117 may analyze the histogram table once every 30 frames. Based on the histogram table analysis, the CPU 117 will update the lookup table used for adjusting the image to be displayed. The updated lookup table values will be applied to each frame to be displayed until the CPU 117 operates to change the lookup table values again. Therefore, the updated lookup table values will be maintained until the CPU 117 analyzes another histogram table and updates the lookup table accordingly.

The graphics controller 103 can include a histogram enable register to essentially trigger the histogram table generation by the histogram circuitry 113. Therefore, whenever the CPU 117 wants the graphics controller 103 to generate the histogram table, the CPU 117 will set the histogram enable register. When the histogram enable register is set, the histogram circuitry 113 will become operational. The histogram circuitry 113 will wait for the beginning of the next frame of data to begin processing. Once the histogram circuitry completes processing of the frame, the histogram circuitry will go idle again. In one embodiment, the CPU 117 can determine when the histogram table generation is completed by polling a histogram status register provided within the graphics controller 103. In another embodiment, an interrupt line can be provided between the histogram circuitry 113 and the CPU 117. Whenever the histogram table generation is complete, the histogram circuitry 113 can inform the CPU 117 by sending an interrupt through the interrupt line.

Figure 2:
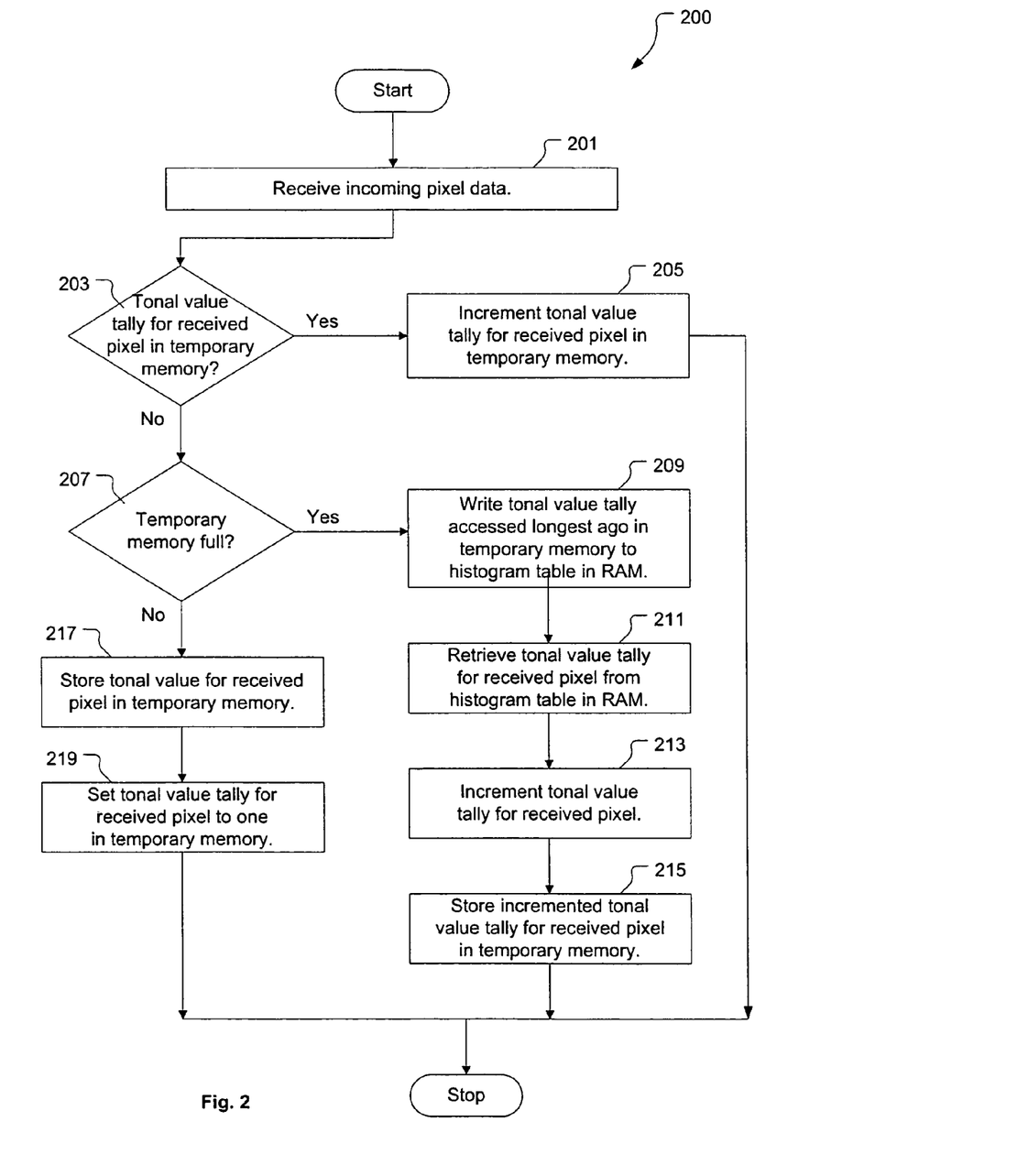
FIG. 2 is an illustration showing a flowchart of a method for processing incoming pixel data to generate a histogram table for a digital image, in accordance with one embodiment of the present invention.

FIG. 2 is an illustration showing a flowchart of a method 200 for processing incoming pixel data to generate a histogram table for a digital image, in accordance with one embodiment of the present invention. It should be understood that the functionality described with respect to the method 200 of FIG. 2 can be implemented within the histogram circuitry 113. The histogram table includes a tally for each tonal value in a set of possible tonal values. As previously discussed, the set of possible tonal values is based on a bit depth of the digital image. Prior to arrival of the first pixel data, the tally for each tonal value in the histogram table is reset to zero. Each time pixel data corresponding to a particular tonal value is received during processing of the incoming digital image, the tally for the particular tonal value is incremented by one. Thus, the tally for each tonal value represents a frequency of occurrence of the tonal value in the digital image.

The method 200 begins with an operation 201 in which incoming pixel data is received by the histogram circuitry 113. The incoming pixel data is defined as a sequence of bits representing a tonal value for the corresponding pixel in the digital image. In an operation 203, the tonal value for the received pixel is checked against a number of tonal values stored in a temporary memory within the histogram circuitry 113 to determine whether the tonal value is present in the temporary memory. The temporary memory is capable of storing a number of tonal values and their corresponding tallies. In one embodiment, the temporary memory is configured to store up to four tonal values and their corresponding tallies. However, in other embodiments, the temporary memory can be configured to store more or less than four tonal values and corresponding tallies. In should be understood that the temporary memory is separate from the histogram table portion of RAM 115 in which the complete histogram table is stored. In various embodiments, the temporary memory can be defined by a number of flip-flops or latches within the histogram circuitry 113. Therefore, it should be appreciated that operations involving the temporary memory do not require access to the histogram table portion of RAM 115.

If the operation 203 determines that the tonal value for the received pixel is in temporary memory, the method 200 proceeds with an operation 205 in which the tally for the tonal value of the received pixel is incremented by one in the temporary memory. The method 200 for processing the incoming pixel data concludes following the operation 205.

If the operation 203 determines that the tonal value for the received pixel is not in temporary memory, the method 200 proceeds with an operation 207. In the operation 207, a determination is made as to whether the temporary memory is full. If the operation 207 determines that the temporary memory is not full, the method 200 proceeds with an operation 217 in which the tonal value for the received pixel data is stored in an available location in the temporary memory. The method 200 then continues with an operation 219 in which a tally corresponding to the tonal value of the received pixel data is set to one in the temporary memory. The method 200 for processing the incoming pixel data concludes following the operation 219.

If the operation 207 determines that the temporary memory is full, the method 200 proceeds with an operation 209. In the operation 209, the tally accessed, i.e., updated/incremented, longest ago in the temporary memory is written to a location in the histogram table portion of RAM 115 corresponding to its tonal value. The method 200 then proceeds from the operation 209 to the operation 211 in which the tonal value tally corresponding to the tonal value of the received pixel data is retrieved from the histogram table portion of RAM 115. Then, in an operation 213, the tonal value retrieved from the histogram table portion of RAM 115 in operation 211 is incremented by one. The method 200 continues by writing the tonal value and corresponding tally value as incremented in the operation 213 to the location in the temporary-memory containing the tonal value tally accessed longest ago. The method 200 for processing the incoming pixel data concludes following the operation 215.

The method 200 as described with respect to FIG. 2 describes how data received for a given pixel is processed by the histogram circuitry 113, in accordance with the present invention. Since digital images are defined by a large number of pixels, the method 200 can be incorporated as a pixel processing operation within a broader method for generating a complete histogram table for an incoming digital image.

Figure 3:
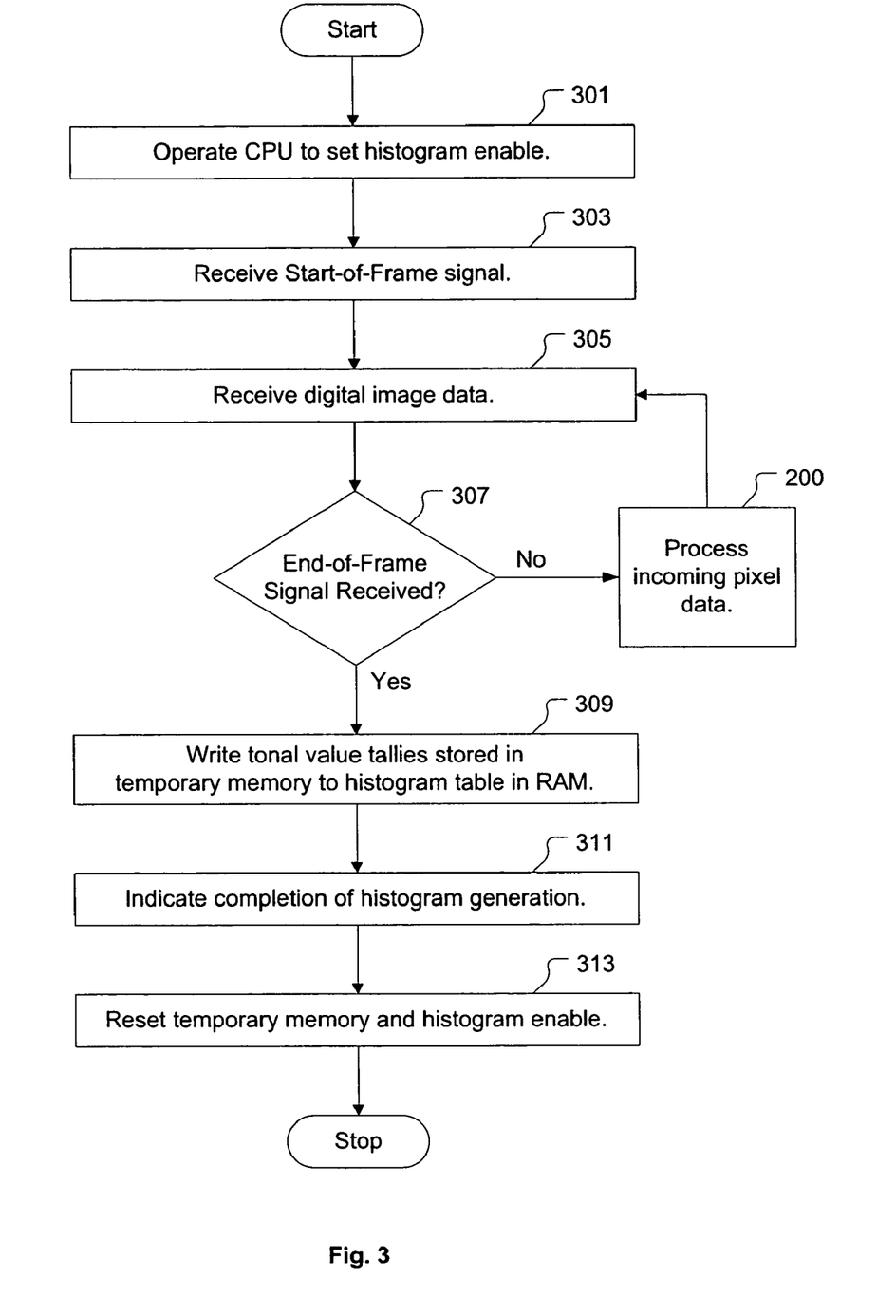
FIG. 3 is an illustration showing a method for generating a histogram for an incoming digital image, in accordance with one embodiment of the present invention.

FIG. 3 is an illustration showing a method for generating a histogram for an incoming digital image, in accordance with one embodiment of the present invention. The method includes an operation 301 in which a CPU of a host device is operated to set a histogram enable signal. The histogram enable signal serves to notify the graphics controller 103 that a histogram table is to be generated for a subsequent incoming digital image. In an operation 303, the graphics controller 103 receives and recognizes a start-of-frame (SOF) signal. The SOF signal triggers the graphics controller 103 to begin transmitting the incoming digital image data to the histogram circuitry 113 to generate the histogram table. It should be appreciated that the SOF signal as referred to herein corresponds to any signal used to indicate commencement of pixel data transmission for a digital image, wherein the digital image can be a digital snapshot or a frame of digital video.

In accordance with an operation 305, data for each pixel of the digital image is received in a sequential manner through the camera interface 105 to be passed to the histogram circuitry 113. In an operation 307, a check is performed to see if the most recently received digital image data corresponds to an end-of-frame (EOF) signal. It should be appreciated that the EOF signal as referred to herein corresponds to any signal used to indicate conclusion of pixel data transmission for the digital image. If the operation 307 determines that the most recently received digital image data is not an EOF signal, the most recently received digital image data is processed as pixel data. Therefore, the method of FIG. 3 proceeds with processing of the received pixel data in accordance with the method 200, as previously described with respect to FIG. 2. Upon conclusion of the method 200, the method of FIG. 3 continues by reverting back to the operation 305 for receiving additional digital image data.

If the operation 307 determines that the most recently received digital image data does represent the EOF signal, the method proceeds with an operation 309 in which each tonal value tally currently stored in the temporary memory of the histogram circuitry 113 is written to the histogram portion of the RAM 115. Therefore, upon completion of the operation 309, histogram table as represented in the histogram portion of the RAM 115 is complete. Thus, the method proceeds with an operation 311 for indicating completion of the histogram generation 311. Also, the method includes an operation 313 in which the temporary memory of the histogram circuitry 113 and the histogram enable signal are reset to be ready for use in processing another digital image.

In accordance with the methods of FIGS. 2 and 3, whenever a tonal value tally is retrieved from the histogram table portion of RAM 115, the tally is incremented but not immediately written back to the histogram table portion of RAM 115. Instead, the tonal value and corresponding incremented tonal value tally are stored in the temporary memory of the histogram circuitry 113. Since currently received pixel data has a high likelihood of having the same tonal value as recently received pixel data, the tonal value of the currently received pixel data is first checked for a match with one of the recently received tonal values stored in the temporary memory. If the currently received tonal value is present in the temporary memory, there is no need to access the histogram table portion of RAM 115 to retrieve the corresponding tally. The tally corresponding to the currently received tonal value can simply be incremented in the temporary memory.

If the currently received tonal value does not match any values in the temporary memory and the temporary memory is not full, the tally corresponding to the currently received tonal value is set to one and stored in an available location of temporary memory along with its associated tonal value. However, if the currently received tonal value does not match any tonal values stored in the temporary memory and the temporary memory is full, the temporary memory location accessed longest ago is written back to the histogram table portion of RAM 115. The tally corresponding to the currently received tonal value is then retrieved from the histogram table, incremented by one, and stored in the location of the temporary memory accessed longest ago. The above process is continued until the entire digital image is processed. Once the entire digital image is processed, the data remaining in the temporary memory of the histogram circuitry 113 is written back to the histogram table portion of RAM 115.

Figure 4A:
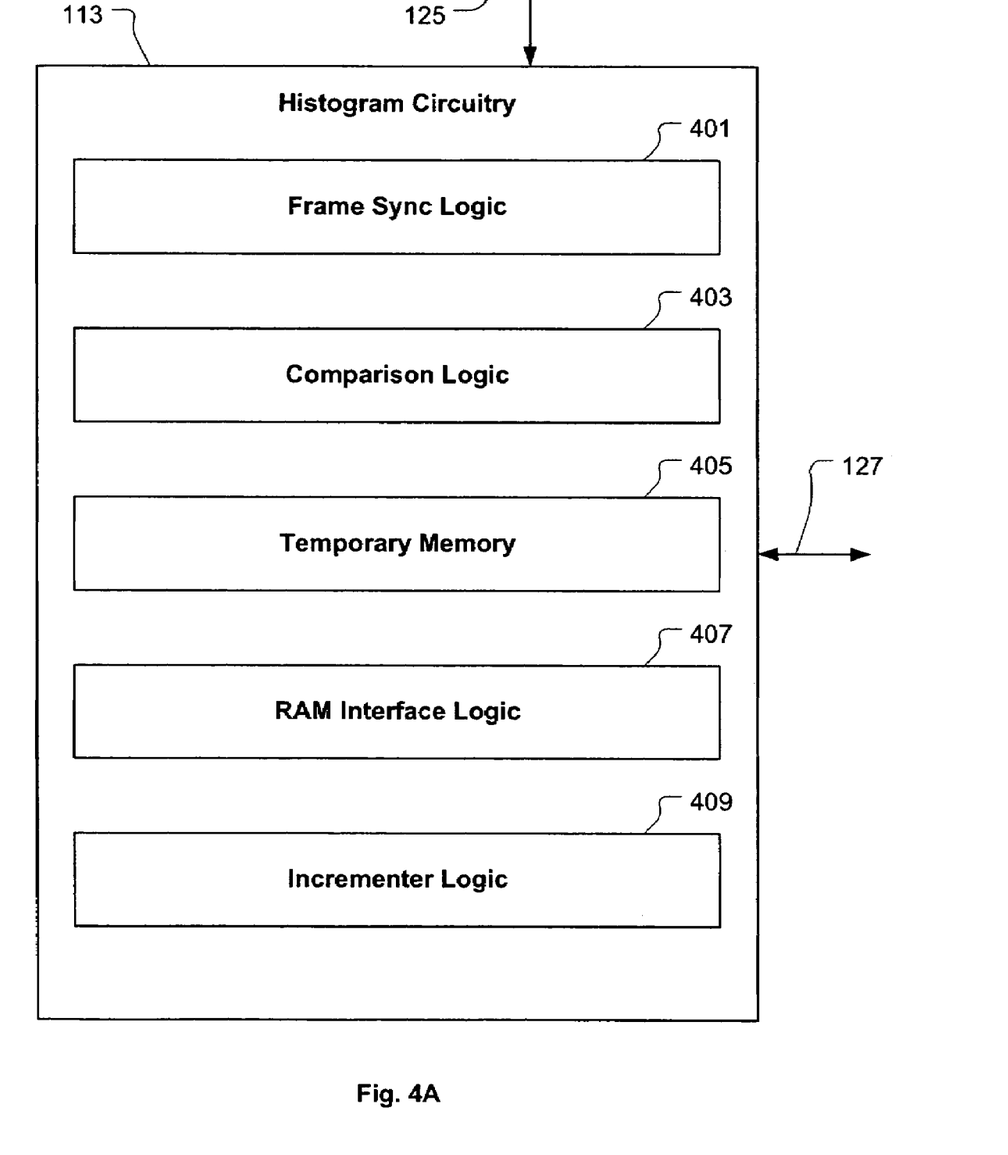
FIG. 4A is an illustration showing a component level view of the histogram circuitry defined to implement the histogram table generation functionality as previously described with respect to FIGS. 2 and 3, in accordance with one embodiment of the present invention.

FIG. 4A is an illustration showing a component level view of the histogram circuitry 113 defined to implement the histogram table generation functionality as previously described with respect to FIGS. 2 and 3, in accordance with one embodiment of the present invention. A previously discussed with respect to FIG. 1, the histogram circuitry 113 is configured to receive incoming digital image data, as indicated by the arrow 125. Also, the histogram circuitry 113 is configured to transfer data to and retrieve data from the histogram table portion of RAM 115, as indicated by the arrow 127.

In one embodiment, the histogram circuitry 113 includes frame sync logic 401, comparison logic 403, a temporary memory 405, RAM interface logic 407, and incrementer logic 409. The temporary memory 405 is configured to store data for a number of pixels, wherein the data includes the tonal value of the pixel and the corresponding tally value. In one embodiment, the temporary memory 405 is capable of storing data for up to four pixels. Also, in various embodiments, the temporary memory 405 can be implemented using flip-flops, latches, or other suitable circuitry. It should be appreciated, however, that the histogram table generation functionality previously described with respect to FIGS. 2 and 3 may be implemented with histogram circuitry configurations other than what is specifically exemplified in FIG. 4A.

With respect to FIG. 4A, the frame sync logic 401 is provided to identify receipt of SOF and EOF signals. The frame sync logic 401 is also configured to direct the histogram circuitry 113 in accordance with receipt of either the SOF or EOF signal. For example, if the SOF signal is received, the frame sync logic 401 will direct the histogram circuitry 113 to handle subsequently received digital image data as incoming pixel data until the EOF signal is received. If the EOF signal is received, the frame sync logic 401 will operate to instruct the histogram circuitry 113 to write back all tonal value tally information currently stored in the temporary memory 405 to the histogram portion of RAM 115. Also, the frame sync logic 401 will operate to instruct the histogram circuitry 113 to reset the temporary memory 405.

The comparison logic 403 is defined to compare the tonal value of incoming pixel data to tonal values currently stored in the temporary memory 405. Upon identifying a match between the tonal value of the incoming pixel data and a tonal value in the temporary memory 405, the comparison logic 403 will signal the incrementer logic 409 to increment the tally in the temporary memory 405 corresponding to the matched tonal value. If a match between the tonal value of the incoming pixel data and a tonal value in the temporary memory 405 is not present, the comparison logic 403 will notify the RAM interface logic 407 accordingly.

The RAM interface logic 407 is primarily responsible for retrieving data from and writing data to the histogram table portion of RAM 115. The RAM interface logic 407 can also be defined to determine if the temporary memory 405 is full. If the temporary memory 405 is full, the RAM interface logic 407 will operate to write the tally value accessed longest ago in the temporary memory 405 back to an appropriate location in the histogram table portion RAM 115. Once a tally value is written back from the temporary memory 405 to the histogram table portion of RAM 115, the RAM interface logic 407 is defined to retrieve the tally value corresponding to the tonal value of the incoming pixel data from the histogram portion of RAM 115. The incrementer logic 409 is then operated to increment the retrieved tally value. Then, the retrieved and incremented tally value along with its tonal value are stored in the temporary memory 405 location occupied by the tonal value and tally having been written back to the histogram table portion of RAM 115. Upon receipt of the EOF signal, the RAM interface logic 407 is defined to write all tally values stored in the temporary memory 405 back to their appropriate locations in the histogram table portion of RAM 115.

Figure 4B:
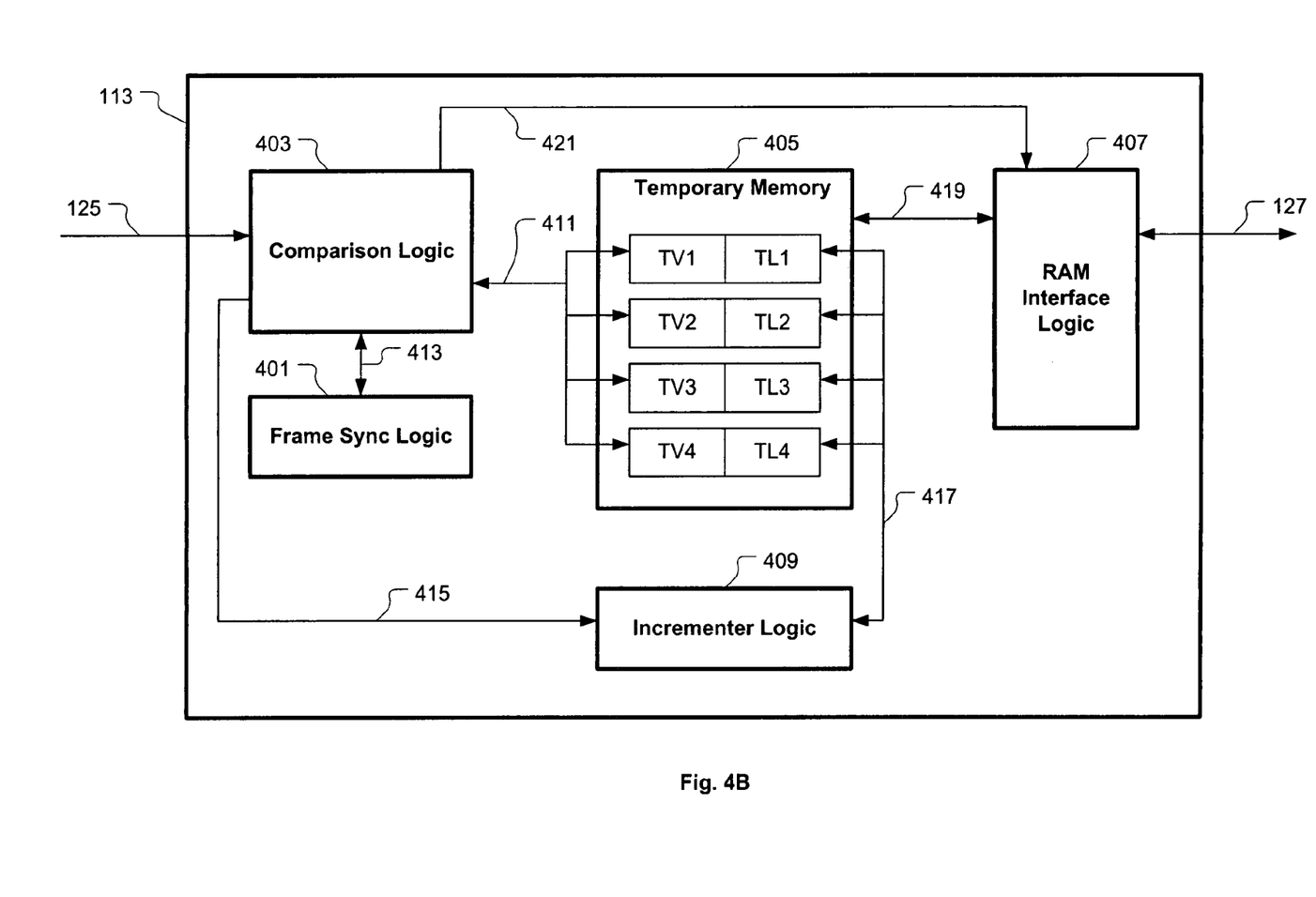
FIG. 4B is an illustration showing connectivity between components of the histogram circuitry as previously described with respect to FIG. 4A, in accordance with one embodiment of the present invention.

FIG. 4B is an illustration showing connectivity between components of the histogram circuitry 113 as previously described with respect to FIG. 4A, in accordance with one embodiment of the present invention. The incoming digital image data, as indicated by the arrow 125, is received by the comparison logic 403. The comparison logic 403 is defined to communicate through a connection 413 with the frame sync logic 401 to determine if the incoming digital image data represents the SOF signal or the EOF signal. If the incoming digital image data does represent the SOF signal or the EOF signal, the frame sync logic 401 directs the histogram circuitry 113 accordingly, as previously described.

The comparison logic 403 is also defined to communicate through a connection 411 with the temporary memory 405 to determine if a received tonal value is currently stored in either of the tonal value storage locations (TV1, TV2, TV3, TV4) of the temporary memory 405. If the comparison logic 403 determines that the received tonal value is currently stored in the temporary memory 405, the comparison logic 403 directs the incrementer logic 409, through a connection 415, to increment by one a tally value corresponding to the received tonal value. The incrementer logic 409 is defined to communicate with the temporary memory 405 through a connection 417 to increment the appropriate tally value. For example, if the received tonal value corresponds to either TV1, TV2, TV3, or TV4, the incrementer logic 409 will function to increment by one the corresponding tally TL1, TL2, TL3, or TL4, respectively, stored within the temporary memory 405. It should be appreciated that in other embodiments the temporary memory 405 can be configured to store less than or more than four tonal values and associated tallies. For example, in certain embodiments, the temporary memory 405 can be configured to store either 1, 2, 3, 5, 6, 7, or 8 tonal values and associated tallies.

If the comparison logic 403 determines that the received tonal value is not currently stored in the temporary memory 405, the comparison logic 403 directs the RAM interface logic 407, through a connection 421, to retrieve the tally from the histogram table portion of RAM 115 that corresponds to the received tonal value. The tally as retrieved from the histogram table portion of RAM 115, is incremented by one and stored in the temporary memory 405 via a connection 419. In one embodiment, the tally as retrieved from the histogram table portion of RAM 115 is incremented by the incrementer logic 409 through the connection 417.

If the temporary memory 405 is full when the RAM interface logic 407 is directed to retrieve the tally for the received tonal value, the RAM interface logic 407 first operates to offload a tally value from the temporary memory 405 to the histogram table portion of RAM 115 via the connections 419 and 127. In one embodiment, the tally having been accessed, i.e., updated/incremented, longest ago is written from the temporary storage 405 to the appropriate location in the histogram table portion of RAM 115. Once the tally value is offloaded from the temporary memory 405, corresponding tonal value and tally storage locations in temporary memory 405 can be used to store the received tonal value and associated tally retrieved from the histogram table portion of RAM 115 by the RAM interface logic 407. Furthermore, when the EOF signal is received, the tallies remaining stored in the temporary memory 405 are written to the histogram table portion of RAM 115 via the connection 419 and the RAM interface logic 407.

The histogram circuitry 113 and associated functionality has been described thus far in terms of generation of a histogram table, wherein each possible tonal value is individually represented in the histogram table. However, the histogram circuitry 113 of the present invention can also be adapted to generate a lower resolution histogram table in which each tally in the lower resolution histogram table represents a range of pixel tonal values. Thus, each tally in the lower resolution histogram table represents a frequency of occurrence of any pixel tonal value within a corresponding tonal value bin.

To generate the lower resolution histogram table, the histogram circuitry 113 can be modified to first convert incoming pixel data into its appropriate tonal value bin and tally accordingly. In one embodiment, each tonal value bin in the lower resolution histogram table can be defined to include a number of pixel tonal values corresponding to an integer power of 2. In this embodiment, the most significant bits can be evaluated to determine the appropriate tonal value bin for an incoming pixel. In other embodiments, correlation circuitry can be implemented to map each incoming pixel tonal value to its appropriate tonal value bin.

Due to the nature of "real-life" images, the histogram table generation apparatus and method of the present invention will drastically reduce the amount of RAM bandwidth required for generating a histogram table for a digital image. Therefore, the RAM bandwidth conservation provided by the present invention will free up RAM bandwidth for use by other processes and/or devices. Also, the RAM bandwidth conservation provided by the present invention serves to significantly reduce power consumption. Therefore, the histogram table generation apparatus and method of the present invention can be particularly useful when implemented in portable electronic devices where power is at a premium. Some portable electronic devices that can benefit from the present invention include digital cameras, digital video recorders, digital camera or video enabled cell phones, and other handheld devices having digital imaging capability.

One skilled in the art will appreciate that the graphics controller of the present invention, including the histogram circuitry, can be defined on a semiconductor chip using logic gates configured to provide the functionality of the methods previously discussed. For example, a hardware description language (HDL) can be employed to synthesize hardware and a layout of the logic gates for providing the necessary functionality described herein.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

The invention claimed is:

1. A histogram generation circuit for processing pixel data of a digital image frame, comprising:
   a temporary memory configured to hold a set of tonal values and associated tallies for each tonal value;
   a comparison circuit for determining if tonal values of incoming pixel data for a current frame being processed are currently stored in the temporary memory; and
   an incrementer circuit for incrementing tallies of tonal values stored in the temporary memory, the incrementing of tallies being processed to maintain a true number of occurrences of the respective tonal values within the current frame being processed.

2. A histogram generation circuit for processing pixel data of a digital image frame as recited in claim 1, further comprising:
   a memory interface for transferring the tallies stored in the temporary memory to a histogram table of a main memory.

3. A histogram generation circuit for processing pixel data of a digital image frame as recited in claim 2, wherein the tallies stored in the temporary memory are transferred to the histogram table of the main memory upon completing the processing of the current frame.

4. A histogram generation circuit for processing pixel data of a digital image frame as recited in claim 2, wherein a tally stored in the temporary memory and incremented longest ago is transferred to the histogram table of the main memory to provide a storage location in the temporary memory for a tally associated with an tonal value within the incoming pixel data.

5. A histogram generation circuit for processing pixel data of a digital image frame as recited in claim 2, wherein the memory interface is configured to retrieve the tally associated with the tonal value within the incoming pixel data from the histogram table of the main memory for incrementing and storage in the temporary memory.

6. A histogram circuit for processing a received stream of pixel data for a frame of pixels, comprising:
   a temporary memory configured to store a number of tonal values and associated tallies for the received stream of pixel data, wherein each tonal value and associated tally represents a portion of a histogram table for the frame of pixels, the temporary memory being separate from a main memory defined to store the histogram table;
   a comparison circuit configured to determine if the tonal value received by the histogram circuit is equal to a tonal value stored in the temporary memory;
   an incrementer circuit configured to increment a tally stored in the temporary memory that is associated with the tonal value having been identified by the comparison circuit as being equal to the tonal value received by the histogram circuit; and
   a memory interface circuit configured to transfer tallies between the temporary memory and the main memory so that the tallies of the tonal values in the temporary memory are maintained current relative to the received stream of pixel data during active processing of the frame.

7. A histogram circuit as recited in claim 6, wherein the temporary memory is defined by flip-flop circuitry or latch circuitry.

8. A histogram circuit as recited in claim 6, wherein the incrementer circuit is configured to increment a tally associated with a given tonal value by one for each instance of the given tonal value received within the stream of pixel data during active processing of the frame by the histogram circuit, each tally representing a frequency of occurrence of the associated tonal value in the frame.

9. A histogram circuit as recited in claim 6, wherein the tonal value is defined as a bit sequence representing a particular color of a pixel in the frame.

10. A histogram circuit as recited in claim 6, wherein the memory interface circuit is configured to write each tally stored in the temporary memory to the main memory upon completion of processing of the frame.

11. A histogram circuit as recited in claim 6, wherein the memory interface circuit is configured to retrieve a tally from the main memory that is associated with a tonal value received by the histogram circuit when the tonal value received by the histogram circuit is not present in the temporary memory, the incrementer circuit being configured to increment the tally retrieved from the main memory by one, the temporary memory being configured to store both the tonal value received by the histogram circuit and the tally value having been retrieved from main memory and incremented.

12. A histogram circuit as recited in claim 6, wherein the memory interface circuit is further configured to write a tally previously stored in the temporary memory back to the main memory to provide storage in the temporary memory for both the tonal value received by the histogram circuit and the tally value having been retrieved from main memory and incremented.

13. A histogram circuit as recited in claim 12, wherein the tally previously stored in the temporary memory and written back to the main memory represents a tally in the temporary memory having been accessed longest ago.

14. A histogram circuit as recited in claim 6, wherein the histogram circuit is a component within a graphics controller, the graphics controller being a component within a portable digital imaging device.

15. A histogram circuit as recited in claim 14, wherein the portable digital imaging device is either a digital camera, a digital video camera, a cell phone, or a personal digital assistant (PDA).

16. A histogram circuit as recited in claim 6, wherein the temporary memory is defined to store four tonal values and associated tallies.

17. A method for operating histogram circuitry to generate a histogram for a digital image, comprising:
    receiving in the histogram circuitry a tonal value for a pixel of the digital image;
    using the histogram circuitry to perform the following:
    determining if the tonal value is present in a temporary memory of the histogram circuitry;
    incrementing in the temporary memory a tally associated with the tonal value when the tonal value is determined to be present in the temporary memory;
    retrieving from a main memory a tally associated with the tonal value when the tonal value is determined to be absent from the temporary memory;
    incrementing the tally retrieved from the main memory; and
    storing both the incremented tally retrieved from the main memory and the associated tonal value in the temporary memory.

18. A method for operating histogram circuitry to generate a histogram for a digital image as recited in claim 17, wherein the tonal value is defined as a bit sequence representing a particular color of a pixel in the digital image.

19. A method for operating histogram circuitry to generate a histogram for a digital image as recited in claim 17, wherein each tally represents a frequency of occurrence of an associated tonal value in the digital image.

20. A method for operating histogram circuitry to generate a histogram for a digital image as recited in claim 17, further comprising:
    determining that the temporary memory is full when the tonal value is determined to be absent from the temporary memory;
    writing a tally present in the temporary memory back to the main memory; and
    storing both the incremented tally retrieved from the main memory and the associated tonal value in a portion of the temporary memory containing the tally written back to the main memory.

21. A method for operating histogram circuitry to generate a histogram for a digital image as recited in claim 20, wherein the tally written back to the main memory represents a tally in the temporary memory having been incremented longest ago.

22. A method for operating histogram circuitry to generate a histogram for a digital image as recited in claim 17, further comprising:
    receiving an end-of-frame signal; and
    writing each tally present in the temporary memory back to the main memory.

23. A method for operating histogram circuitry to generate a histogram for a digital image as recited in claim 22, further comprising:
    indicating completion of the histogram generation; and
    resetting the temporary memory and a histogram enable signal.

24. A method for operating histogram circuitry to generate a histogram for a digital image as recited in claim 17, further comprising:
    receiving a start-of-frame signal to initiate operation of the histogram circuitry to generate the histogram for the digital image.

* * * * *